United States Patent [19]

Koller et al.

[11] 4,078,890

[45] Mar. 14, 1978

[54] PROCESS FOR THE DYEING AND PRINTING OF POLYESTER MATERIAL

[75] Inventors: Stefan Koller, Pratteln; Alain Vantillard, Riehen, both of Switzerland

[73] Assignee: Ciba-Geigy Corporation, Ardsley, N.Y.

[21] Appl. No.: 684,041

[22] Filed: May 7, 1976

Related U.S. Application Data

[63] Continuation of Ser. No. 463,633, Apr. 24, 1974, abandoned, which is a continuation of Ser. No. 271,642, Jul. 14, 1972, abandoned.

[51] Int. Cl.$^2$ .............................................. D06P 3/52
[52] U.S. Cl. ............................................. 8/179; 8/15; 8/39 C; 8/41 C; 260/156; 260/158; 260/162; 260/187; 260/207; 260/207.1; 260/272; 260/278; 260/373; 260/374
[58] Field of Search .............. 8/41 C, 39 C, 15, 179 R

[56] References Cited

U.S. PATENT DOCUMENTS

| | | | |
|---|---|---|---|
| 1,931,806 | 10/1931 | Ulrich | 8/86 X |
| 2,290,945 | 7/1942 | Dahlen | 8/8 X |
| 2,359,862 | 10/1944 | Linch | 260/204 |
| 3,255,173 | 6/1966 | Dohnert | 8/1 K |

FOREIGN PATENT DOCUMENTS

| | | | |
|---|---|---|---|
| 459,954 | 1/1937 | United Kingdom | 8/41 C |
| 914,075 | 12/1962 | United Kingdom | 8/41 C |
| 898,991 | 1/1962 | United Kingdom | 8/41 C |

OTHER PUBLICATIONS

Mullen, Acetate Silk, 264–265, 274–276, 1929, Van Nostrand.

*Primary Examiner*—Donald Levy
*Attorney, Agent, or Firm*—Edward McC. Roberts; Prabodh I. Almaula

[57] ABSTRACT

The invention relates to a process for the dyeing and printing of polyester material in a weakly acid, neutral or alkaline solution of at least one altered dispersion dyestuff water-soluble at an intermediate stage and containing a carbacyl group which is bound by way of an oxygen atom, and which can be split off under the dyeing conditions, the said carbacyl group carrying at least one sulphonic acid or carboxylic acid group, to a process for the production of these dyestuffs water-soluble at an intermediate stage, as well as to new water-soluble dyestuffs. Compared with the conventional process of dispersion dyeing, this process offers certain definite advantages, namely, the dyestuffs need not be present as a dispersion, the complicated milling problems associated with dispersion dyestuffs are eliminated; no dispersing agents are required, which are mostly toxic and thus burden the effluent; and hence, furthermore, the troublesome foam problems normally occurring in large-scale dyeing plants are likewise avoided.

6 Claims, No Drawings

PROCESS FOR THE DYEING AND PRINTING OF POLYESTER MATERIAL

This is a continuation of application Ser. No. 463,633, filed Apr. 24, 1974, now abandoned, which is a continuation of application Ser. No. 271,642, filed on July 14, 1972, now abandoned.

The invention relates to a process for the dyeing and printing of polyester material, with dispersion dyestuffs water-soluble at an intermediate stage, to a process for the production of these dyestuffs water-soluble at an intermediate stage, as well as to new water-soluble dyestuffs.

Polyester materials are dyed, as is known, with dispersion dyestuffs. These are coloured organic compounds of which only traces dissolve in water, and which are absorbed as a molecular-disperse phase on to the polyester material. For this purpose, the dispersion dyestuffs have to be ground very finely before the actual dyeing process, and stabilised by the addition of large amounts of dispersing agents. During dyeing the dyestuff is present not in solution but as a dispersion.

Great difficulties are consequently often experienced in practice, for these dyestuff dispersions are frequently unstable and the dyestuff often crystallises out, which are additional factors leading to uneven dyeings. In high-temperature dyeing, in particular, an inadequate dispersion stability becomes noticeable in consequence of filtration phenomena in the case of dense material, e.g. on cross coils and in beam dyeing. Furthermore, the dispersing agents can lead to the formation of foam in large dyeing machines, and constitute, since they mostly poisonous, a serious burden with regard to the resulting effluent. Difficulties are likewise met with in the dyeing of mixed fabrics, since water-soluble dyestuffs are frequently incompatible with the dispersing agents for dispersion dyestuffs.

A process has now been discovered which enables dyeing polyester while avoiding these difficulties. The new process consists of dyeing in a weakly acid, neutral or alkaline solution of at least one altered dispersion dyestuff water-soluble at an intermediate stage and containing a carbacyl group which is bound by way of an oxygen atom, and which can be split off under the dyeing conditions, the said carbacyl group carrying at least one water-solubilising group.

This process is distinguished by the following stages:

A dispersion dyestuff having at least one hydroxyl group is acylated with a compound introducing the radical —CO—R, wherein R represents any desired, optionally further substituted aliphatic, cycloaliphatic, carbocyclic or heterocyclic radical containing at least one ionically water-solubilising group, or group convertible into such a group, such as, e.g. a sulphonic acid chloride group which hydrolizes in water to form a sulphonic acid group. An acid or basic water-soluble dyestuff, i.e. the water-soluble form of this dispersion dyestuff, is thereby obtained. Under suitably chosen dyeing conditions, such as elevated temperature of about 80° to 130° C, and a pH value of ca. 4 to 8, especially 7, there occurs as a result of hydrolysis on the acyl group a re-formation of the dispersion original dyestuff, which is now absorbed on to the polyester material. With optimum conditions, the respective rates of hydrolysis and absorption of the water-soluble or dispersion dyestuff are in such a ratio that free dispersion dyestuff cannot accumulate, i.e. that free dispersion dyestuff is immediately absorbed; the dye bath remains clear, and dyeing can be performed without a dispersing agent and further auxiliaries, thereby affording, in addition, a contribution towards the overcoming of the effluent problem, in that the effluent, due to the absence of dispersing agents, is less burdened. Expressed by a structural formula, the process involved is, for example the following:

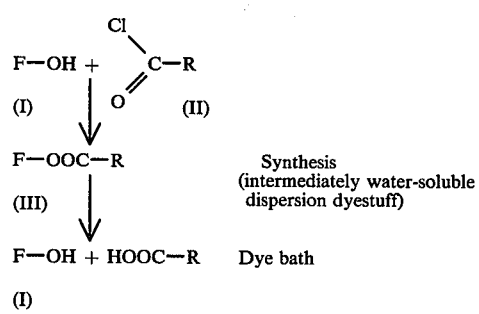

Synthesis (intermediately water-soluble dispersion dyestuff)

Dye bath wherein
F represents a dispersion dyestuff, and
R has the above given meaning.

The dispersion dyestuffs of formula I serving as starting dyestuffs and containing at least one hydroxyl group are known, and can be produced by known methods. These dispersion dyestuffs can belong to any desired classes of dyestuffs. They may be, for example, optionally metal-containing mono- or polyazo dyestuffs, which also includes formazan dyestuffs; anthraquinone dyestuffs; nitro, methine, styryl, naphthoperinone, quinophthalone, oxazine and phthalocyanine dyestuffs. Metal-free azo and anthraquinone dyestuffs are preferred. Examples of these are as follows:

a) Monoazo dyestuffs

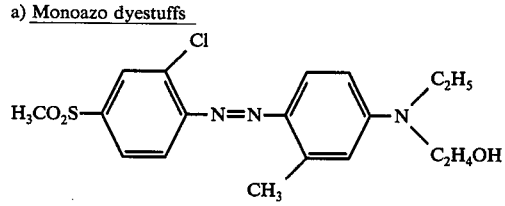

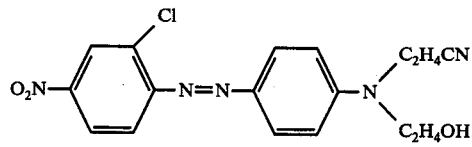

-continued
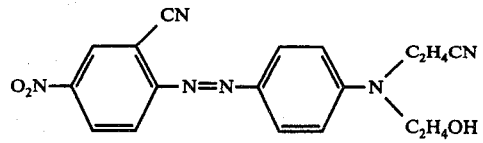
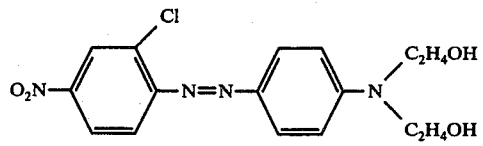
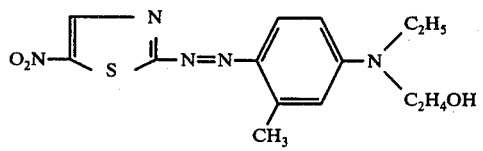
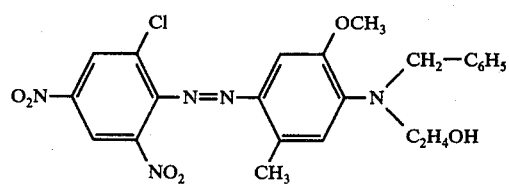
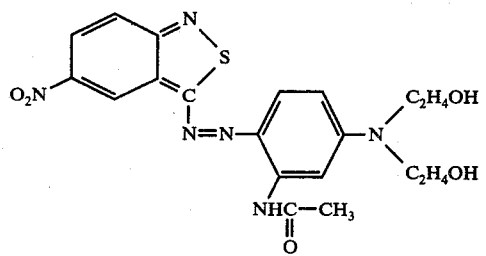
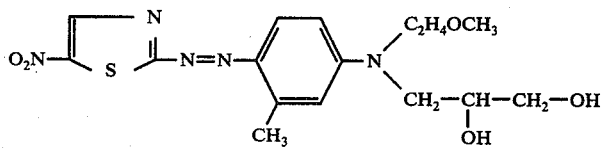
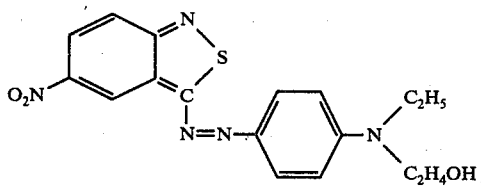
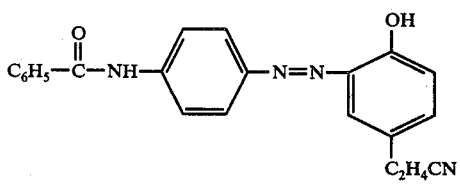
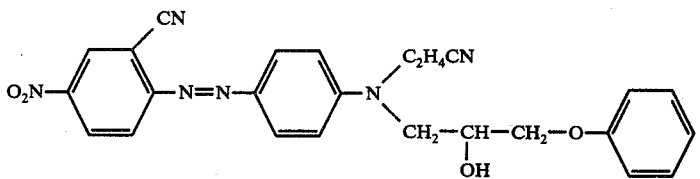

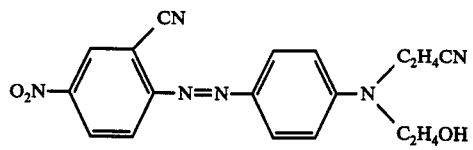
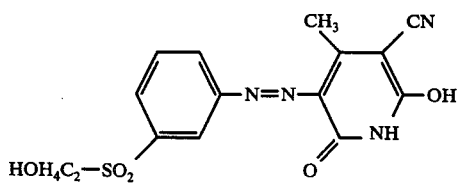
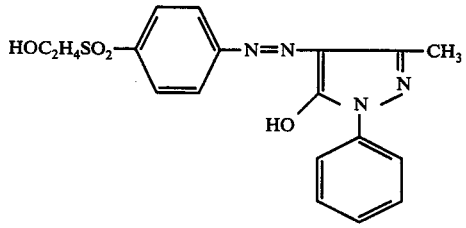
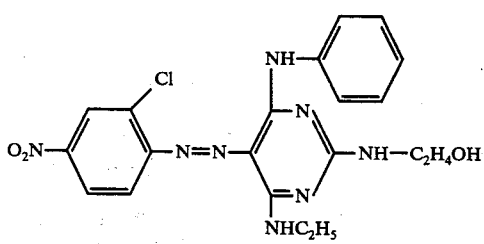
b) Disazo dyestuffs
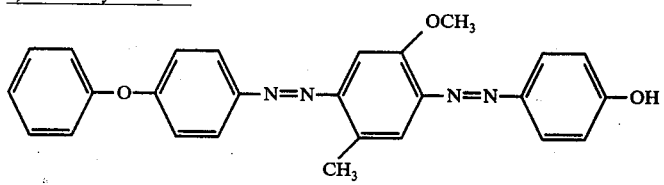
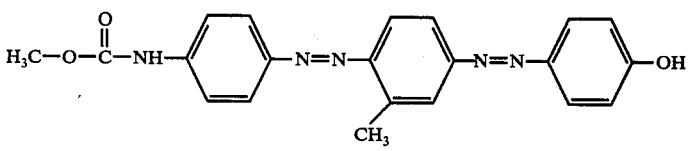
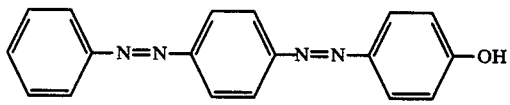
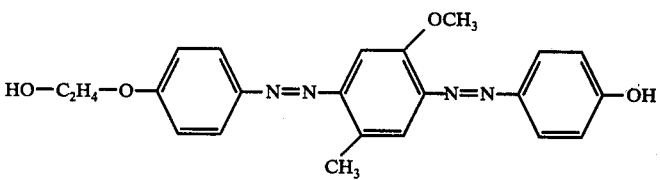
c) Anthraquinone dyestuffs
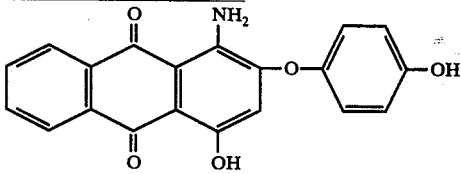

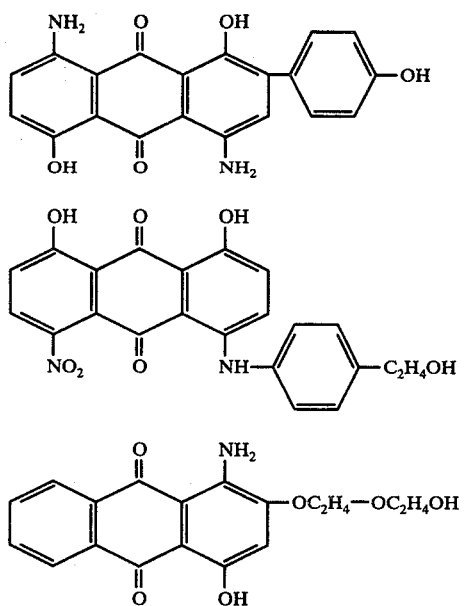

-continued

Suitable compounds introducing the radical —CO—R, known as acylating agents, are those which contain, besides the group producing acylation, at least one substituent effecting the solubility of the dyestuffs, particularly in water, such as, e.g. a sulphonic acid group, a carboxyl group, a phosphate group, or an ammonium group such as a trimethylammonium group or pyridinium group.

The acylating agents in question may for example be acid halides, especially chlorides, of aromatic carboxylic acids, or also acid anhydrides. The substituents producing water solubility can be converted, after the action of the acylating agent on the dispersion dyestuff, into the alkali metal compounds, e.g. into the sodium salt of sulphonic acid.

These acylating agents are also known and can be produced by known methods. For example, they are obtained by halogenation, particularly chlorination, of the corresponding carboxylic acids, e.g. with phosgene, phosphorus oxychloride, phosphorus pentachloride or, preferably, thionyl chloride; or also by the process in which the corresponding carboxylic acids are reacted with chlorosulphonic acid.

The esterification or acylation reaction between the dispersion dyestuff of formula I and the acylation agent of formula II is performed by the usual methods; e.g. by the heating of the dispersion dyestuffs with the acylating agent in the presence of tertiary bases such as, e.g. dialkylaminobenzenes, and, in particular, in the presence of cyclic tertiary bases, such as pyridine.

Readily water-soluble dyestuffs of formula III are thus obtained (i.e. dispersion dyestuffs rendered water-soluble) which hydrolyse on the carbacyl group in the aqueous bath, under the suitable dyeing conditions mentioned in the introduction, to give the starting dispersion dyestuff, and which are then absorbed on to the polyester material.

These dyestuffs of formula III are for the most part new. Particularly interesting compounds correspond to the following constitution:

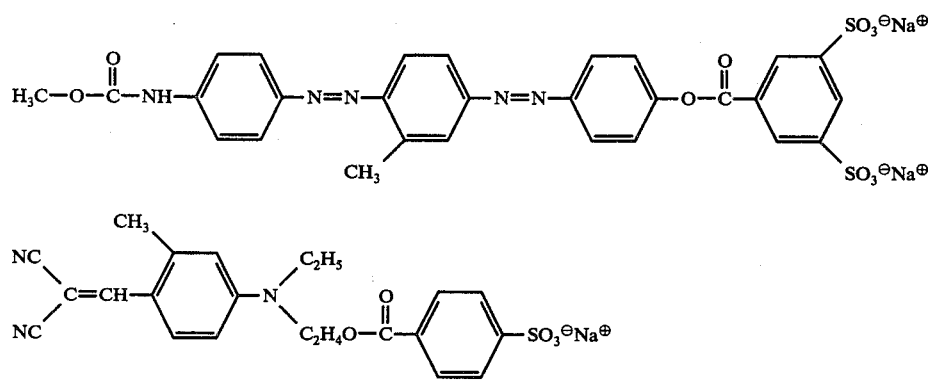

-continued
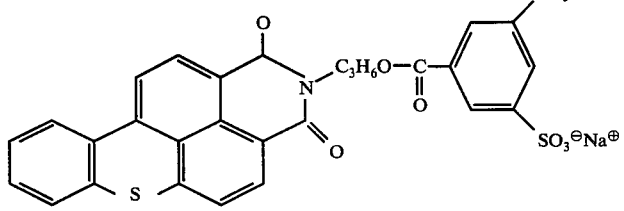
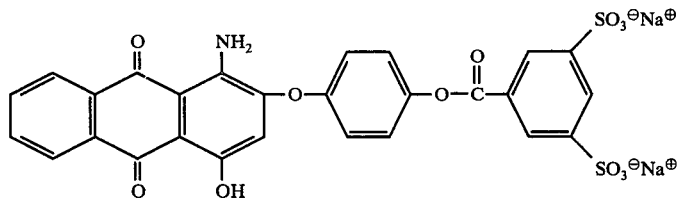
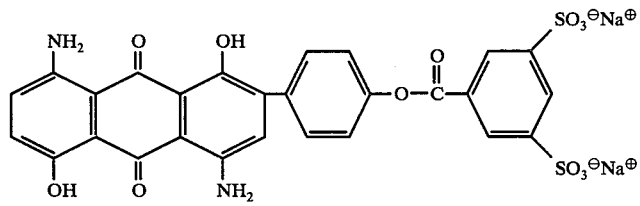
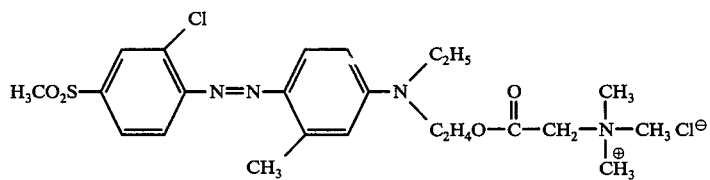
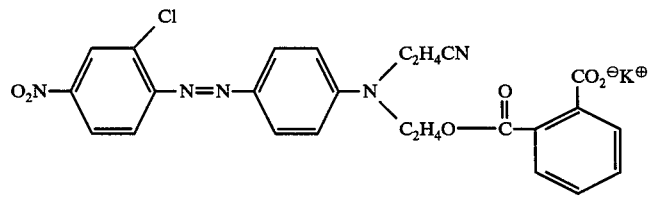
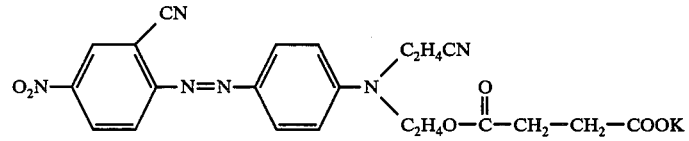
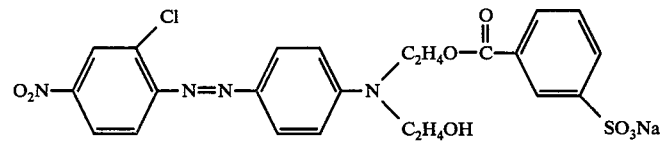
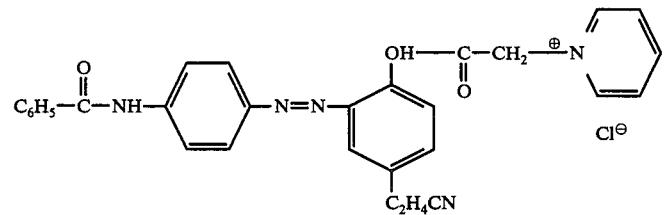

-continued
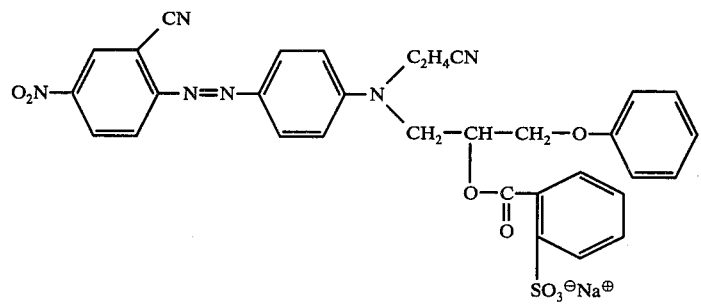
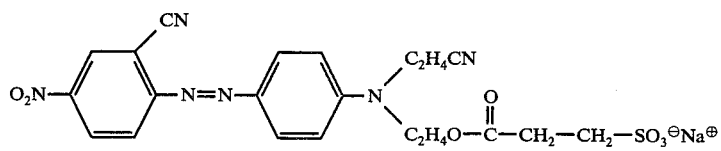
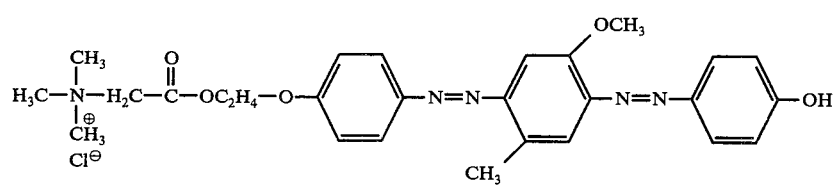
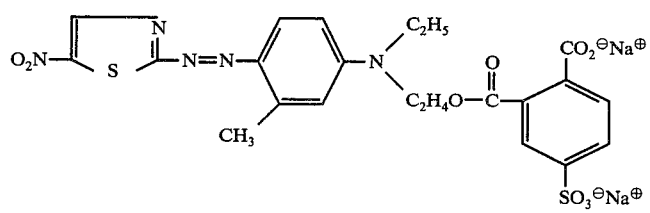
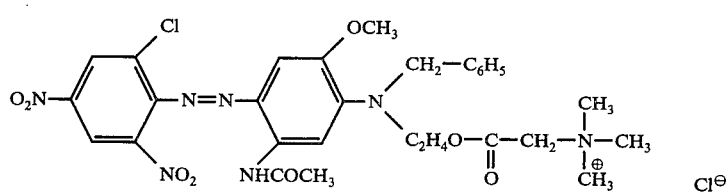
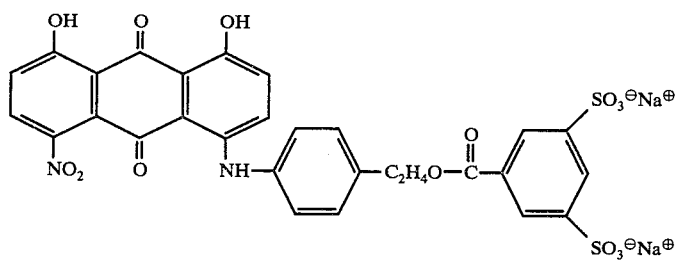
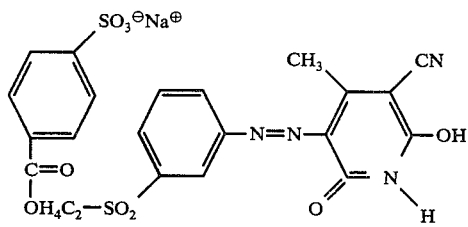

-continued
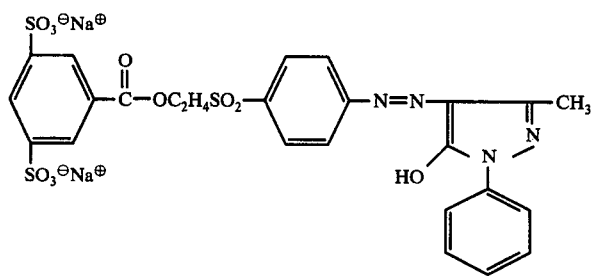
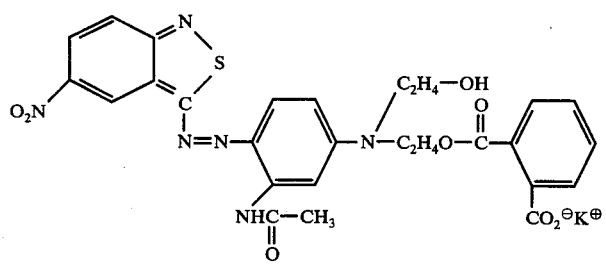
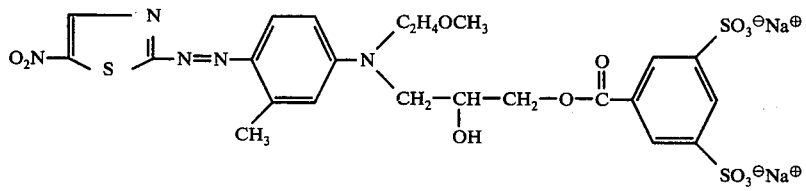
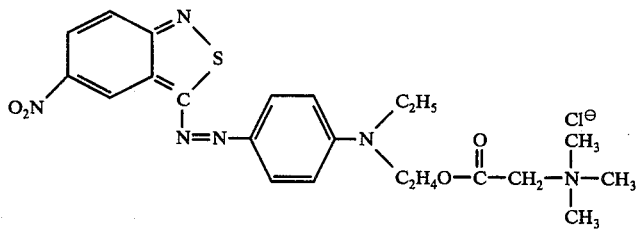
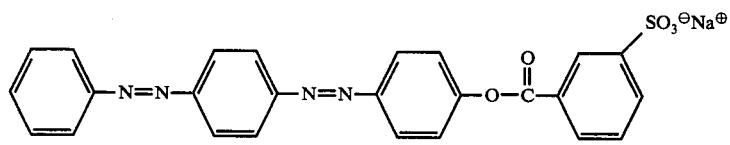
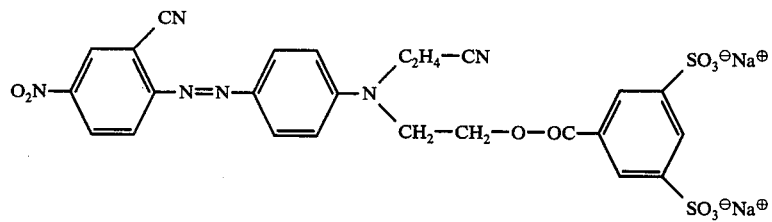
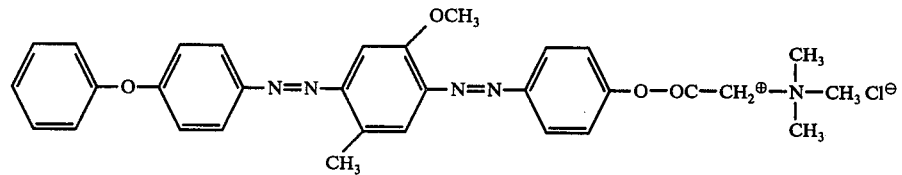

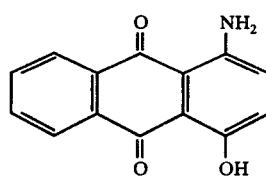

Suitable polyester materials are, e.g. polyethylene terephthalate, or condensation products of terephthalic acid and 1,4-bis-(hydroxymethyl)-cyclohexane.

These polyester materials may be in the most diverse processed forms, such as threads, knitwear, fabrics, yarns or fibres.

These polyester materials are dyed with the dyestuffs of formula III under such conditions that the carbacyl group is again split off in the dye bath; that is to say that a saponification occurs, with the originial water-insoluble dispersion dyestuff thus being formed, which is then absorbed as such on the polyester material.

The process by which this is achieved comprises the dyeing of this material for about 50 to 100, preferably 60 minutes at elevated temperature, e.g. at between 80° and 130° C, optionally under pressure, in a weakly-acid, neutral or weakly-alkaline bath, e.g. with a pH-value of ca. 4 to 8, preferably 6 to 8 and especially 7; buffers, such as disodium phosphate, are optionally added to the bath.

The process has the advantage that it is extraordinarily simple to carry out. Both the dyeing and the pressurising process can be performed by the usual operating methods; and, apart from the partially new dyestuff derivatives, no unusual substances are required, no disproportionately large amounts of auxiliaries, and also no special equipment.

Compared with the conventional process of dispersion dyeing, this process offers certain definite advantages, as already mentioned at the commencement; namely, the dyestuffs need not be present as a dispersion; the complicated milling problems associated with dispersion dyestuffs are eliminated; no dispersing agents are required, which are mostly toxic and thus burden the effluent; and hence, furthermore, the troublesome foam problems normally occurring in large-scale dyeings plants are likewise avoided.

The invention relates also to new water-soluble dyestuffs of formulae IIIa $$F_1 - O - CO - R$$

and IIIb $$F_2 - O - CO - R$$

wherein
  $F_1$ represents the radical of an organic dispersion dyestuff, particularly of the anthraquinone dyestuff class, containing no azo groups and groups producing an acid reaction on dissociating in water, and
  $F_2$ represents the radical of a disperse azo dyestuff containing no phenolic hydroxyl groups in o-position, no aniline groupings containing diethyleneoxy groups, and no groups producing an acid reaction on dissociating in water, and
  R represents an optionally further substituted aliphatic cycloaliphatic, aromatic and heterocyclic radical having at least one ionically water-solubilising group, especially a sulphonic acid group, carboxyl group or ammonium group such as trimethylammonium group or the pyridinium group, or a group convertible into such a group.

R in the meaning of an alkyl moiety represents, for example, an alkyl moiety with 1 to 4 carbon atoms, such as the methylene or ethylene moiety; in the meaning of an aromatic moiety a naphthyl, especially the phenyl moiety, which may be further substituted by halogen, lower alkyl or lower alkoxy groups; in the meaning of a heterocyclic moiety a furan or thiophene moiety; and in the meaning of a cycloaliphatic moiety a cyclohexyl moiety, which in keeping with the definition is substituted by at least one sulphonic acid, carboxyl or trimethylammonium group or pyridinium group.

These dyestuffs of formulae IIIa and IIIb are obtained by the reaction of the corresponding dispersion dyestuffs of formula Ia:

$$F_1 - OH$$

or Ib:

$$F_2 - OH$$

with a compound introducing the radical R—CO—, in accordance with the data previously given.

The dyestuffs of particular interest are those of formulae IIIa and IIIb wherein R represents a sulphonated aromatic carboxylic acid radical, especially a benzenesulphonic acid radical, and $F_1$ represents an anthraquinone radical.

These water-soluble dyestuffs of formulae IIIa and IIIb can be used, for example, upon their hydrolysis, for the dyeing of the polyester materials mentioned in the introduction.

The following examples illustrate the invention without limiting its scope to the given examples. The temperatures are expressed in degrees Centigrade.

EXAMPLE 1

An amount of 0.5 g of the anthraquinone dyestuff of the formula:

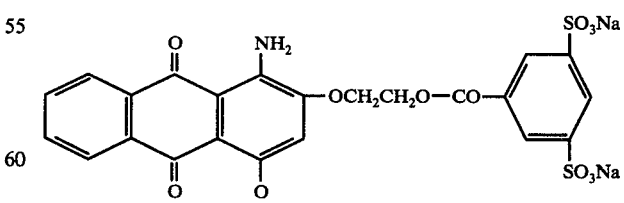

is dissolved in 600 g of water in a pressure-dyeing apparatus. The solution is then adjusted by means of a disodium phosphate buffer to a pH-value of 7 and heated to 40°; 30 g of polyglycol terephthalate yarn is then introduced. The closed bath is thereupon heated in 30 minutes to 130°, and dyeing performed for 60 minutes at this temperature under pressure. During the dyeing, the water-solubilizing carbacyl group is split off by means of hydrolysis and the fibre is dyed with the anthraquinone dispersion dyestuff. The resulting dyeing is then rinsed with water and dried. A brilliant red dyeing is obtained having good fastness to light, rubbing, perspiration and sublimation.

The water-soluble anthraquinone dyestuff employed in this example is produced as follows:

An amount of 6.8 g of the dispersion dyestuff of the formula:

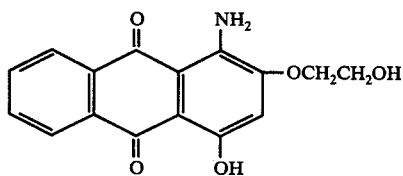

is dissolved in 50 ml of anhydrous pyridine. An addition is made portionwise to this solution at a temperature of −10° to 0° of 6.4 g of benzoic acid-3,5-disulphochloride. Stirring is maintained for 30 minutes at this temperature, and the pyridine subsequently removed under reduced pressure in a rotary evaporator. The solid substance remaining behind is taken up in 200 ml of water, and the solution extracted twice with ethyl acetate. The water-soluble anthraquinone dyestuff is thereupon precipitated from the aqueous solution by the addition of sodium chloride; it is then filtered and dried in vacuo.

If, instead of 0.5 g of the anthraquinone dyestuff, equivalent amounts of the water-soluble dyestuffs obtainable according to the above data from the dispersion dyestuffs listed in the following table, column II, and the acid chlorides or acid anhydrides given in column III, with otherwise the same procedure as described in the above dyeing example, then equally good dyeings on polyglycol terephthalate yarn are obtained with the shades as shown in coumn IV, whereby the dyeings resulting from hydrolysis of these water-soluble dyestuffs in the dye bath are dyed with the dispersion dyestuffs enumerated in column II.

Table-continued
| I | II | III | IV |
|---|---|---|---|
| 8 | 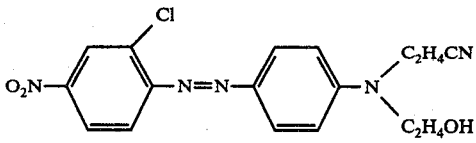 | 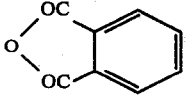 | scarlet red |
| 9 | 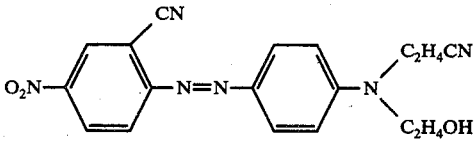 | 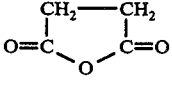 | red |
| 10 | 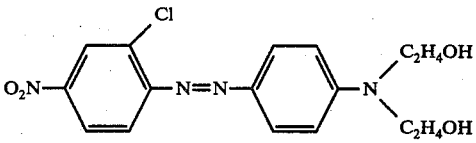 | 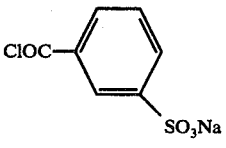 | red |
| 11 | 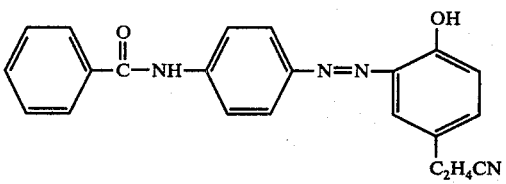 | 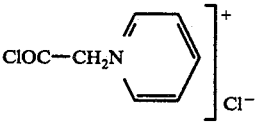 | yellow |
| 12 | 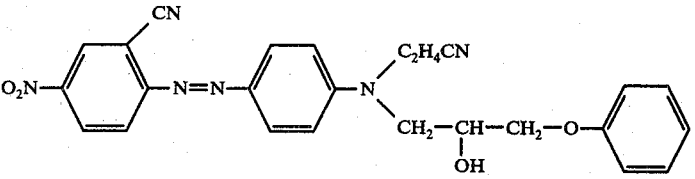 |  | red |
| 13 | 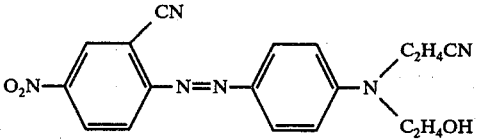 | ClOC—CH$_2$—CH$_2$—SO$_3$Na | " |
| 14 | 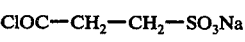 | 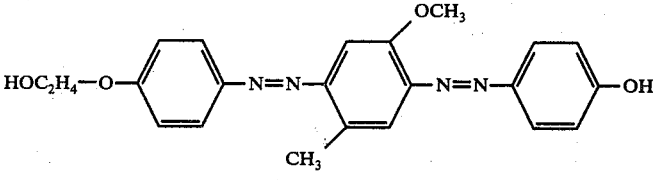 | orange |
| 15 | 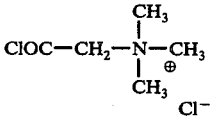 | 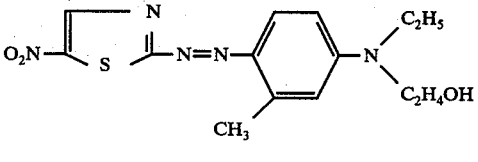 | blue |
| 16 | 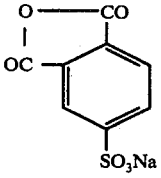 | 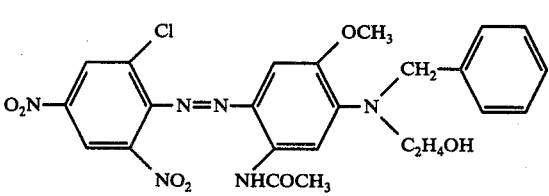 | navy blue |

Table-continued

| I | II | III | IV |
|---|---|---|---|
| 17 | 1,8-dihydroxy-5-nitro-4-(4-(2-hydroxyethyl)anilino)anthraquinone | ClOC-C$_6$H$_3$(SO$_3$Na)$_2$ (3,5-disulfo) | blue |
| 18 | azo dye: 3-(2-hydroxyethylsulfonyl)phenyl—N=N—C(CH$_3$)=C(CONH)—C(OH)=C(CN) | ClOC—C$_6$H$_4$—SO$_3$Na (para) | yellow |
| 19 | HOC$_2$H$_4$—SO$_2$—C$_6$H$_4$—N=N-(1-phenyl-3-methyl-5-hydroxypyrazol-4-yl) | ClOC—C$_6$H$_4$—SO$_3$Na (meta) | " |
| 20 | 5-nitrobenzo-2,1,3-thiadiazol-4-yl—N=N—[2-acetamido-4-(N,N-bis(2-hydroxyethyl)amino)phenyl] | phthaloyl peroxide (benzene-1,2-dicarbonyl diperoxide) | blue |
| 21 | 5-nitrothiazol-2-yl—N=N—[2-methyl-4-(N-(2-methoxyethyl)-N-(2,3-dihydroxypropyl)amino)phenyl] | ClOC-C$_6$H$_3$(SO$_3$Na)$_2$ | " |
| 22 | 6-nitrobenzo-2,1,3-thiadiazol-4-yl—N=N—[4-(N-ethyl-N-(2-hydroxyethyl)amino)phenyl] | ClOC—CH$_2$—N$^+$(CH$_3$)$_3$ Cl$^-$ | " |
| 23 | C$_6$H$_5$—N=N—C$_6$H$_4$—N=N—C$_6$H$_4$—OH | ClOC—C$_6$H$_4$—SO$_3$Na (meta) | yellow |
| 24 | [2-cyano-4-nitrophenyl]—N=N—[4-(N-(2-cyanoethyl)-N-(2-hydroxyethyl)amino)phenyl] | ClOC-C$_6$H$_3$(SO$_3$Na)$_2$ (3,5-disulfo) | red |

| I | II | III | IV |
|---|---|---|---|
| 25 | Ph-O-C6H4-N=N-C6H2(OCH3)(CH3)-N=N-C6H4-OH | [ClOC-CH2-N(CH3)3]⊕ Cl⊖ | orange |
| 26 | 1-amino-4-hydroxy-2-(O-C2H4-O-C2H4-OH)-anthraquinone | ClOC-C6H3(SO3Na)2 | red |
| 27 | Ph-NH-CO-C6H4-N=N-C6H3(OH)(CH3) | " | yellow |
| 28 | " | ClOC-(furan)-SO3Na | " |
| 29 | " | ClOC-(thiophene)-SO3Na | " |
| 30 | " | ClOC-CHCl-SO3Na | " |
| 31 | " | ClOC-CH2-SO3Na | " |
| 32 | " | ClOC-C6H3(NO2)-SO3Na | " |
| 33 | " | maleic anhydride-CH2-CH(SO3Na) | " |
| 34 | Ph-NHSO2-C6H4-NH-C6H3(NO2)-N=N-C6H3(OH)(CH3) | ClOC-C6H3(SO3Na)2 | " |
| 35 | Ph-N=N-C6H4-N=N-C6H4-OH | ClOC-(furan)-SO3Na | " |
| 36 | H3CO-C6H4-N=N-C6H3(CH3)-N=N-C6H4-OH | ClOC-C6H3(SO3Na)2 | orange |

Table-continued

| I | II | III | IV |
|---|---|---|---|
| 37 | O$_2$N—C$_6$H$_4$—N=N—C$_6$H$_3$(OCH$_3$)—N=N—C$_6$H$_4$—OH | " | " |
| 38 | O$_2$N—C$_6$H$_4$—N=N—C$_6$H$_2$(OCH$_3$)(CH$_3$)—N=N—C$_6$H$_4$—OH | " | " |
| 39 | O$_2$N-thiazole—N=N—C$_6$H$_3$(CH$_3$)—N(C$_2$H$_5$)(C$_2$H$_4$OH) | ClOC—CH$_2$—N$^\oplus$(CH$_3$)$_3$ Cl$^\ominus$ | blue |
| 40 | " | ClOC—CH$_2$—N$^\oplus$(pyridinium) Cl$^\ominus$ | " |
| 41 | H$_3$CSO$_2$—C$_6$H$_3$(Cl)—N=N—C$_6$H$_4$—N(C$_2$H$_5$)(C$_2$H$_4$OH) | " | scarlet |
| 42 | O$_2$N—C$_6$H$_3$(Cl)—N=N—C$_6$H$_4$—N(C$_2$H$_4$CN)(C$_2$H$_4$OH) | ClOC—CH$_2$—N$^\oplus$(CH$_3$)$_3$ Cl$^\ominus$ | " |
| 43 | O$_2$N—C$_6$H$_3$(CN)—N=N—C$_6$H$_4$—N(C$_2$H$_4$CN)(CH$_2$—CH(OH)—CH$_2$OC$_6$H$_5$) | ClOC—CH$_2$—N$^\oplus$(pyridinium) Cl$^\ominus$ | red |
| 44 | O$_2$N—C$_6$H$_2$(Cl)$_2$—N=N—C$_6$H$_4$—N(C$_2$H$_4$CN)(CH$_2$—CH(OH)—CH$_2$Cl) | " | brown |
| 45 | O$_2$N—C$_6$H$_2$(Cl)(NO$_2$)—N=N—C$_6$H$_2$(OCH$_3$)(NHCOCH$_3$)—NH—CH$_2$—CH(OH)—CH$_2$—O— | " | navy blue |
| 46 | O$_2$N—C$_6$H$_2$(Cl)(NO$_2$)—N=N—C$_6$H$_2$(OCH$_3$)(NHCOCH$_3$)—N(C$_2$H$_4$CN)(C$_2$H$_4$OH) | " | " |
| 47 | " | ClOC—CH$_2$—N$^\oplus$(CH$_3$)$_3$ Cl$^\ominus$ | " |

EXAMPLE 48

An amount of 0.1 g of the dyestuff of the formula:

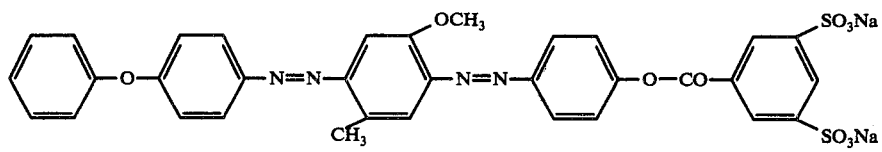

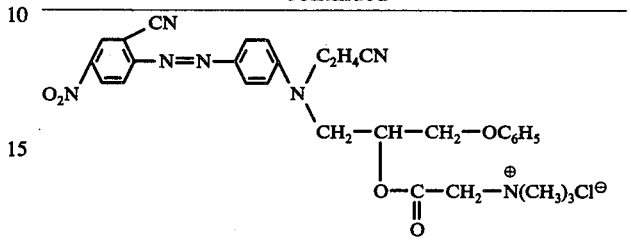

is dissolved in 400 g of water. An addition is made of 0.5 g of o-phenylphenol to the solution, and the pH-value adjusted to 7 by means of a disodium phosphate buffer.

An amount of 10 g of polyglycol terephthalate fabric is then introduced at 40°, the temperature is raised within 30 minutes of 100°, and dyeing performed for 90 minutes at this temperature. The dye bath is extensively exhausted during the dyeing process. During the dyeing, the water-solubilizing carbacyl group is split off by means of hydrolysis and the fibre is dyed with the dispersion disazo dyestuff. The dyeing is rinsed with water, and subsequently saponified for 15 minutes at 95° with 0.5 g of a sulphonated fatty acid condensation product. The dyed material is afterwards rinsed with water and dried. An orange-red dyeing is obtained having outstanding fastness to light, to sublimation and to washing.

The water-soluble dyestuff employed in this example is produced as follows:

An amount of 12 g of the dispersion dyestuff of the formula:

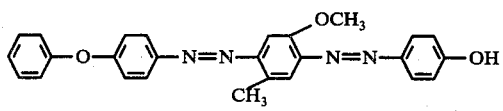

is dissolved in 150 ml of anhydrous pyridine. An addition is made portionwise to this solution at 40° to 50° of 10.90 g of benzoic acid-3,5-disulphochloride. Stirring is carried out for 2 hours at this temperature, and the pyridine exclusively removed under reduced pressure in a rotary evaporator. The solid substrate remaining behind is taken up in 250 ml of water, and extracted with ethyl acetate. The dyestuff is precipitated from the aqueous solution by the addition of sodium chloride and potassium chloride; the water-soluble dyestuff is then filtered and dried in vacuo.

EXAMPLE 49

A printing paste is prepared from the following components:

---
10 g of the dyestuff of the formula 

500 g 2% aqueous fine-flour ether thickener,
 3 g m-nitrobenzene sulphonic acid-sodium salt,
 30 g trichloroacetic acid-sodium salt,
 <u>457 g water</u>
 1000 g
---

A fabric of polyethylene terephthalate is printed with this printing paste in customary fashion on a film or Rouleaux printing machine. The fabric is then dried at 120°, subsequently steamed at 1.5 atmospheres for 30 minutes and soaped at 60° to 80°.

A red print with excellent fastness to washing, moisture, sublimation and light is thereby obtained.

We claim:

1. A process for the dyeing of synthetic, linear polyester textile fibers, comprising the steps of contacting the polyester material with an aqueous solution of a modified disperse dyestuff, at a pH of 4 to 8, and heating the solution in contact with the polyester material to a temperature of 80° to 130° C, wherein the modified disperse dyestuff is a dyestuff of the formula

F — O — CO — R wherein
F is a radical of a disperse dyestuff which contains no groups producing an acid reaction on dissociating in water, and
R is an aromatic group containing at least one carboxylic acid or sulphonic acid group, or an ammoniummethyl group, and wherein, under the specified conditions, the R—CO carbacyl group is hydrolyzed off the modified disperse dyestuff molecule to give a water-insoluble disperse dyestuff which is absorbed by the polyester material.

2. The process of claim 1, wherein the aqueous solution is at a pH of 6 to 8.

3. The process of claim 1, wherein the aqueous solution is weakly acidic.

4. The process of claim 1, wherein R is a sulphonated phenyl group.

5. The process of claim 1, wherein R is N-pyridiniummethyl.

6. The process of claim 1, wherein R is trimethylammoniummethyl.

* * * * *